United States Patent [19]
Gehris et al.

[11] Patent Number: 6,122,102
[45] Date of Patent: Sep. 19, 2000

[54] SIGHTING APPARATUS FOR AIMING AN OPTICAL DEVICE

[75] Inventors: James D. Gehris, Rancho Palos Verdes; Wesley A. King, Orange, both of Calif.

[73] Assignee: McDonnell Douglas Corporation, St. Louis County, Mo.

[21] Appl. No.: 09/027,097

[22] Filed: Feb. 20, 1998

[51] Int. Cl.⁷ ................................................. G02B 23/00
[52] U.S. Cl. ........................... 359/429; 359/554; 396/13; 348/208
[58] Field of Search .................................... 359/429, 430, 359/876, 555; 396/12, 13, 428; 310/12; 348/208

[56] References Cited

U.S. PATENT DOCUMENTS

| | | | |
|---|---|---|---|
| 3,638,502 | 2/1972 | Leavitt et al. | 74/5.34 |
| 3,867,011 | 2/1975 | Burns | 359/896 |
| 4,404,592 | 9/1983 | Pepin et al. | 348/169 |
| 4,447,023 | 5/1984 | Reid | 244/17.11 |
| 4,643,539 | 2/1987 | Brignall | 359/555 |
| 4,752,791 | 6/1988 | Allred | 396/13 |
| 4,833,351 | 5/1989 | Forys et al. | 310/12 |
| 5,220,456 | 6/1993 | Haessig, Jr. | 359/554 |
| 5,285,313 | 2/1994 | Kobayashi et al. | 359/554 |
| 5,465,924 | 11/1995 | Schneider | 244/118.1 |
| 5,897,223 | 4/1999 | Tritchew et al. | 396/13 |

*Primary Examiner*—Cassandra Spyrou
*Assistant Examiner*—Mark A. Robinson
*Attorney, Agent, or Firm*—Alston & Bird, LLP

[57] ABSTRACT

A sighting apparatus is provided for aiming an optical device mounted on a moving platform and having both coarse and fine adjustment. The sighting apparatus includes a fixed base and an outer support ring that is capable of rotation by a drive motor about an azimuthal axis perpendicular to an axis defined by the outer support ring. A support hub is rotatably supported within the outer support ring and is capable of rotation by a drive motor about an elevational axis substantially coincident with the axis defined by the outer support ring. At least one mounting plate is supported by the support hub and the mounting plate is capable of movement about the azimuthal and elevational axes relative to the support hub, and the mounting plate is capable of movement about a roll axis perpendicular to the azimuthal and the elevational axes. The mounting plate is driven about the azimuthal and the elevational axes relative to the support hub by a two axis electromagnetic actuator attached to the mounting plate and the support hub.

8 Claims, 9 Drawing Sheets

SIGHTING APPARATUS FOR AIMING AN OPTICAL DEVICE

FIELD OF THE INVENTION

The present invention relates generally to sighting apparatuses, and more particularly, to a sighting apparatus for aiming an optical device mounted on a moving platform and having both coarse and fine adjustment.

BACKGROUND OF THE INVENTION

Stabilization of video cameras and other optical devices is a challenge, particularly when these instruments are mounted on moving platforms such as trucks, tanks, aircraft or ships. An optical device mounted on such a platform can be used in a variety of ways including news reporting, industrial reporting or military reconnaissance and intelligence purposes. However, such platforms vibrate when the vehicles to which they are mounted are in operation and optical devices mounted to such platforms require stabilization to compensate for the erratic movement of the vehicle, which can be unpredictable. Vehicle movement and vibration problems become even more serious when the magnification of such instruments is increased; not only is the object being viewed magnified, but the motion thereof relative to the moving platform is also magnified. Therefore, when optical devices are mounted on these vehicles it is critical that the instrument itself be stabilized.

Stabilized optical systems attempt to overcome vibration problems by isolating the optical instrument(s) from angular and linear disturbances. Because these instruments are mounted on moving external platforms, the optics must also be isolated from air loads and weather conditions while the optics of the instrument are inertially stabilized. Optical stabilization systems address these problems in different ways while attempting to provide the angular acceleration, angular rates and angular coverage required to obtain the maximum benefit of advanced optical instruments. In particular, some conventional systems have both coarse and fine adjustment motors to provide a wide range of motion while maintaining a sufficient degree of positional accuracy.

Stabilization systems exist which use a number of different designs and electromechanical components. As an illustration, U.S. Pat. No. 3,638,502 discloses a "stabilized camera mount" which is made pendulous to be self-erecting by relying on the gravitational and inertial forces of the system itself. This stabilized camera mount is not a combination coarse and fine adjustment stabilization system. Instead, the camera mount is stabilized directly by a spinning mass gyro, uses a helical spring with alternating metallic and plastic strips for passive vibration isolation and utilizes rotational motors and gears to move the camera line of sight. Thus, the camera mount relies on a number of complex movements which necessitate the use of a number of gears and motors to achieve stabilization. The system design crowds these components into a relatively small envelope, thereby exposing cables and wires to moving parts and increasing the potential for system malfunction or failure.

Also noteworthy is U.S. Pat. No. 4,752,791, which discloses a general purpose "camera mount" that is driven by an elaborate system of motors and sprockets. Notwithstanding the complexity of the camera mount, the system is a coarse system only and does not provide for fine stabilization of an optical instrument. The camera mount includes an "open rectangular frame" which cannot be rigid while in operation and prevents the camera mount from providing high servo bandwidth and fine stabilization to the optical instrument. Like the '502 patent, the elaborate system of motors and sprockets making up the invention disclosed in the '791 patent increases the potential for system malfunction or failure because of the intricacies of the system and the large number of moving parts and wires mounted within close proximity. In addition, the number of parts and wires each contribute to the cost of the device.

Consequently, there is a need for a system for stabilizing optical instruments that has the wide range and precision capability of separate coarse and fine adjustment systems. However, such a system would preferably also minimize the potential for system malfunction or failure by decreasing the number of moving parts such as rotational drive motors.

SUMMARY OF THE INVENTION

These and other needs are provided, according to the invention, by a sighting apparatus for aiming an optical device having both coarse and fine adjustment and wherein the fine adjustment is provided for both azimuthal and elevational axes by a two axis electromagnetic actuator. More particularly, the sighting apparatus includes a fixed base and an outer support ring attached to the fixed base. The support ring defines a coarse first axis and is rotatably supported on the fixed base such that the outer support ring can rotate about a coarse second axis that is orthogonal to the first coarse axis. The outer support ring is rotated about the coarse second axis by a first drive motor which provides coarse adjustment to the sighting apparatus about the coarse second axis by such rotation.

The apparatus also preferably includes a support hub which is supported within the outer support ring such that the support hub can rotate about the coarse first axis defined by the support ring. A second drive motor is included for rotating the support hub relative to the outer support ring, thereby providing coarse adjustment to the sighting apparatus about the coarse first axis.

At least one mounting plate is also included as part of the apparatus for mounting an optical device to be aimed by the sighting apparatus. The mounting plate is supported by the support hub such that the mounting plate can move about a fine first axis and a fine second axis relative to the support hub. The fine first axis is substantially coincident with the coarse first axis.

The sighting apparatus also includes a two axis electromagnetic actuator that has at least one magnet fixed to either the support hub or the mounting plate and at least two electrical coils fixed to the other of the support hub or the mounting plate. The magnet is mounted such that it is movable in two axes relative to the electrical coils upon application of electrical energy to the coils such that the mounting plate is moved about the fine first axis and the fine second axis relative to the support hub. A plurality of roll spring dampers for damping movement of the mounting plate about a roll axis are also included. The roll axis perpendicular to the coarse first axis and perpendicular the coarse second axis.

BRIEF DESCRIPTION OF THE DRAWINGS

Some of the objects and advantages of the invention have been set forth and other objects and advantages of the invention will become apparent in the detailed description of the preferred embodiments of the invention to follow, especially when taken in conjunction with the accompanying drawings, which are not necessarily drawn to scale.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
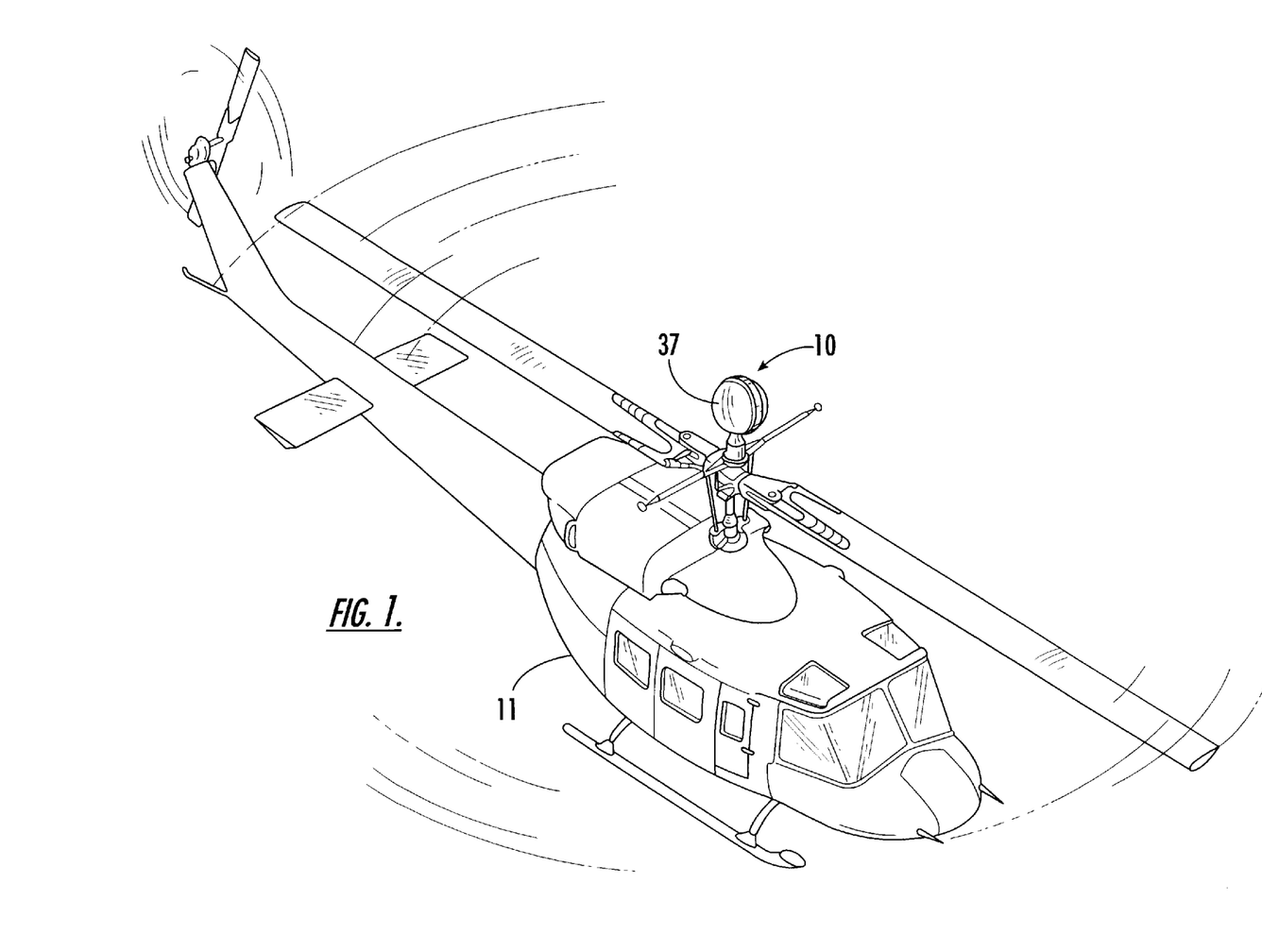
FIG. 1 is an environmental perspective view of a helicopter with a sighting apparatus according to the present invention mounted to the mast of the helicopter.

FIG. 1 illustrates the use of a sighting apparatus 10 according to the present invention attached to the mast of a helicopter 11 for supporting an optical device. Sighting apparatus 10 is shown covered by a bubble shaped shroud 37. While the illustrated embodiment and the following description describe the method and apparatus of the present invention in conjunction with a helicopter, the sighting apparatus need not be used in conjunction with a helicopter, but can instead be used in conjunction with any moving platform. In addition, although illustrated as having a generally vertical configuration and mounted to the top of a helicopter, the invention could be mounted at a different orientation on the helicopter 11 or other moving platforms. For example, the invention could be suspended in an inverted orientation under a dirigible.

Figure 2:
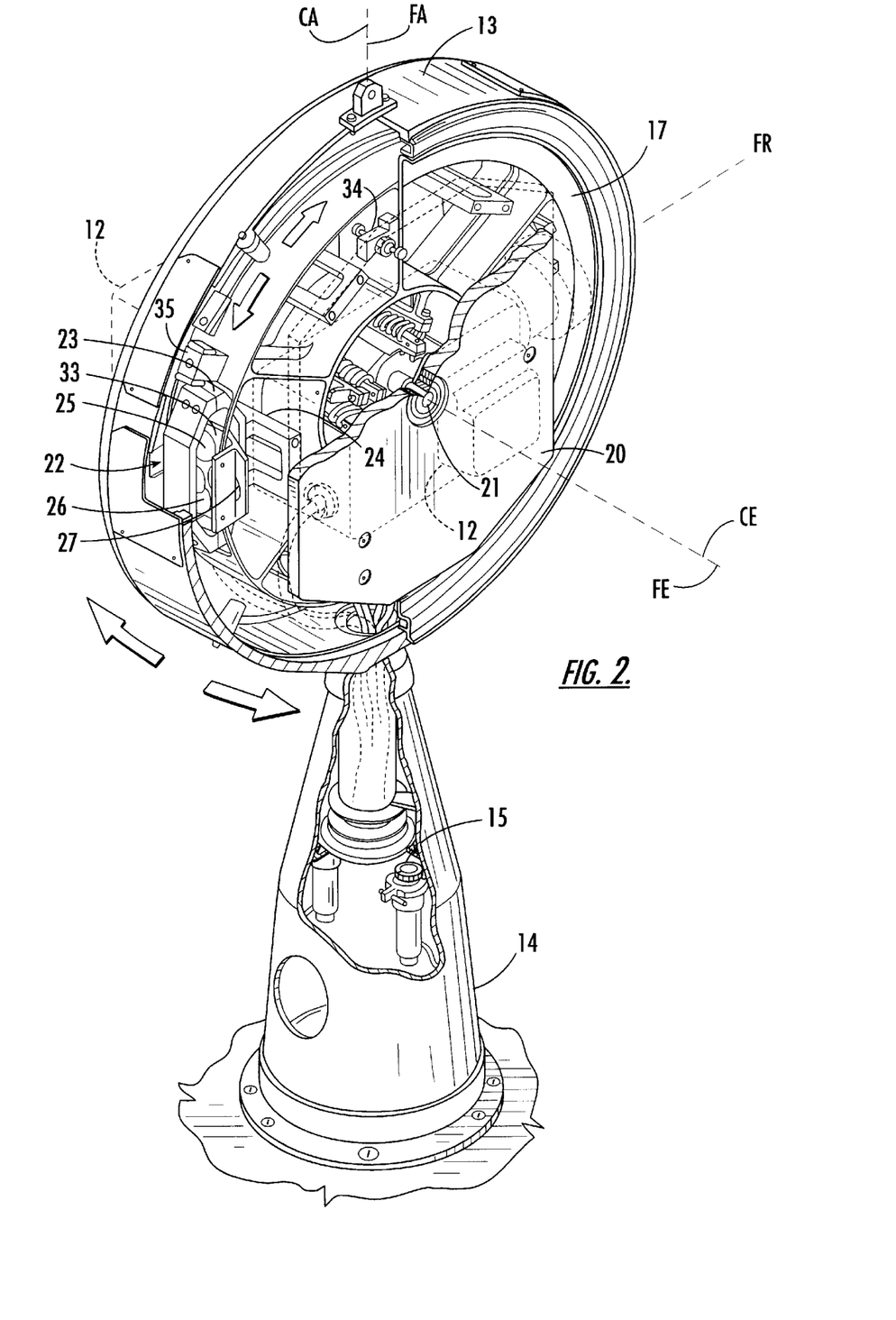
FIG. 2 is a partly cut-away perspective view of the sighting apparatus.

As shown in FIG. 2, sighting apparatus 10 supports one or more optical devices 12, such as the two video cameras illustrated. However, it will be appreciated that other optical devices could be supported including lasers, infrared cameras and radar antennas. The apparatus includes various elements such as an outer support ring 13 which is rotatably mounted on a fixed base 14. The fixed base 14 is rigidly secured to the mast of the helicopter 11 such as by bolts. The outer support ring 13 defines a coarse first axis which is preferably substantially horizontal to define an elevational axis CE for the optical devices 12. The outer support ring 13 is capable of being rotated about a coarse second axis which is preferably substantially vertical to define an azimuthal axis CA, and which is orthogonal to the elevational axis CE. Accordingly, the optical devices 12 can be aimed over a wide range of motion by moving the sighting apparatus about the elevational axis CE, the azimuthal axis CA or any combination thereof.

Figure 3:
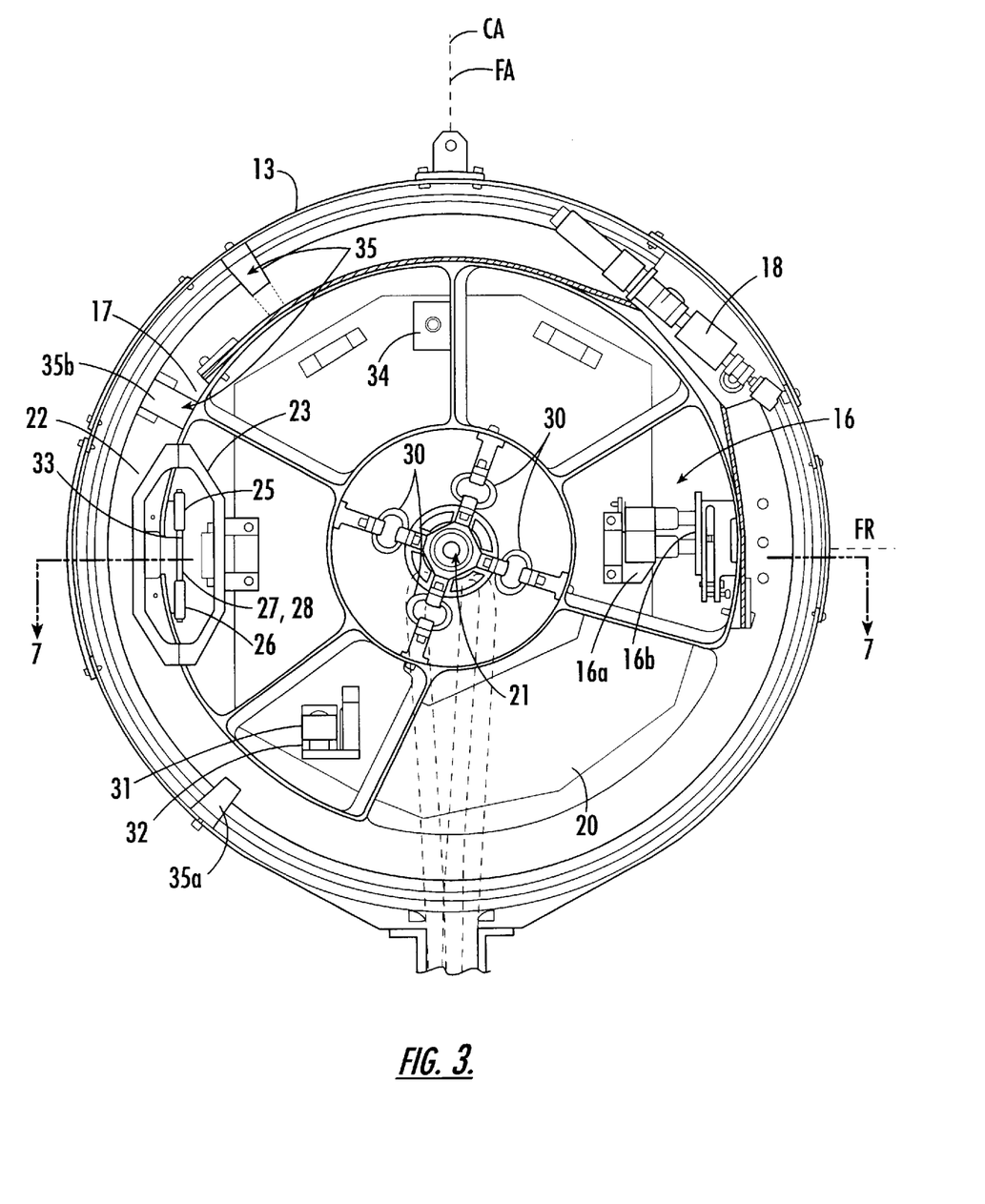
FIG. 3 is an elevational view of an outer support ring and support hub of the sighting apparatus and illustrates some of the coarse and fine adjustment mechanisms of the apparatus.

In one embodiment, outer support ring 13 is rotated about azimuthal axis CA by a first drive motor 15, housed within fixed base 14, through communication with one of at least two single axis autocollimators 16, shown in FIG. 3. At least one two axis autocollimator could also be used. Autocollimators are well known to those skilled in the art and function to control the coarse drive system as a result of the movements of the fine drive system as discussed below.

Figure 7:
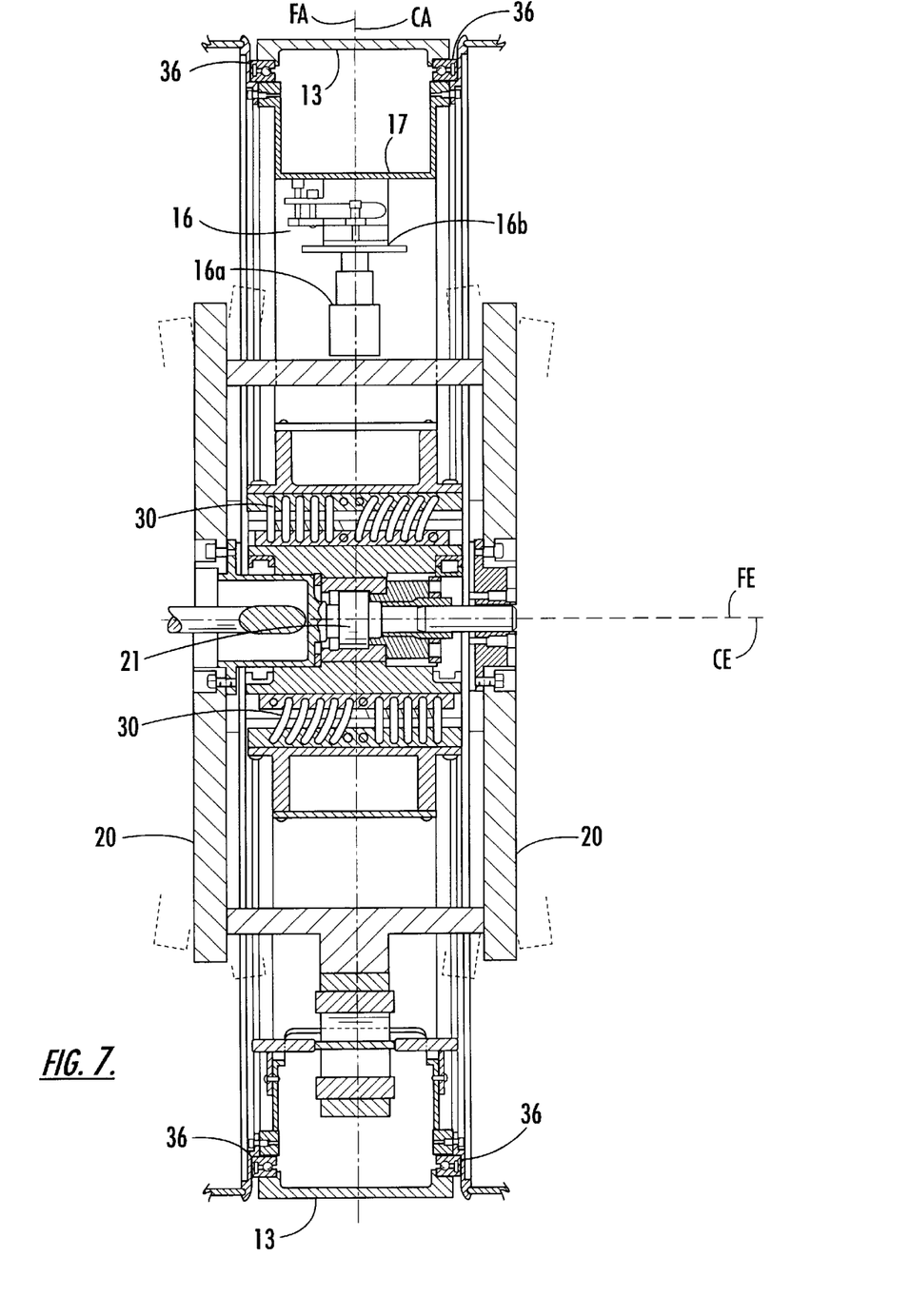
FIG. 7 is a sectional view of a portion of a sighting apparatus according to the present invention taken along lines 7—7 of FIG. 3.
Figures 8, 9:
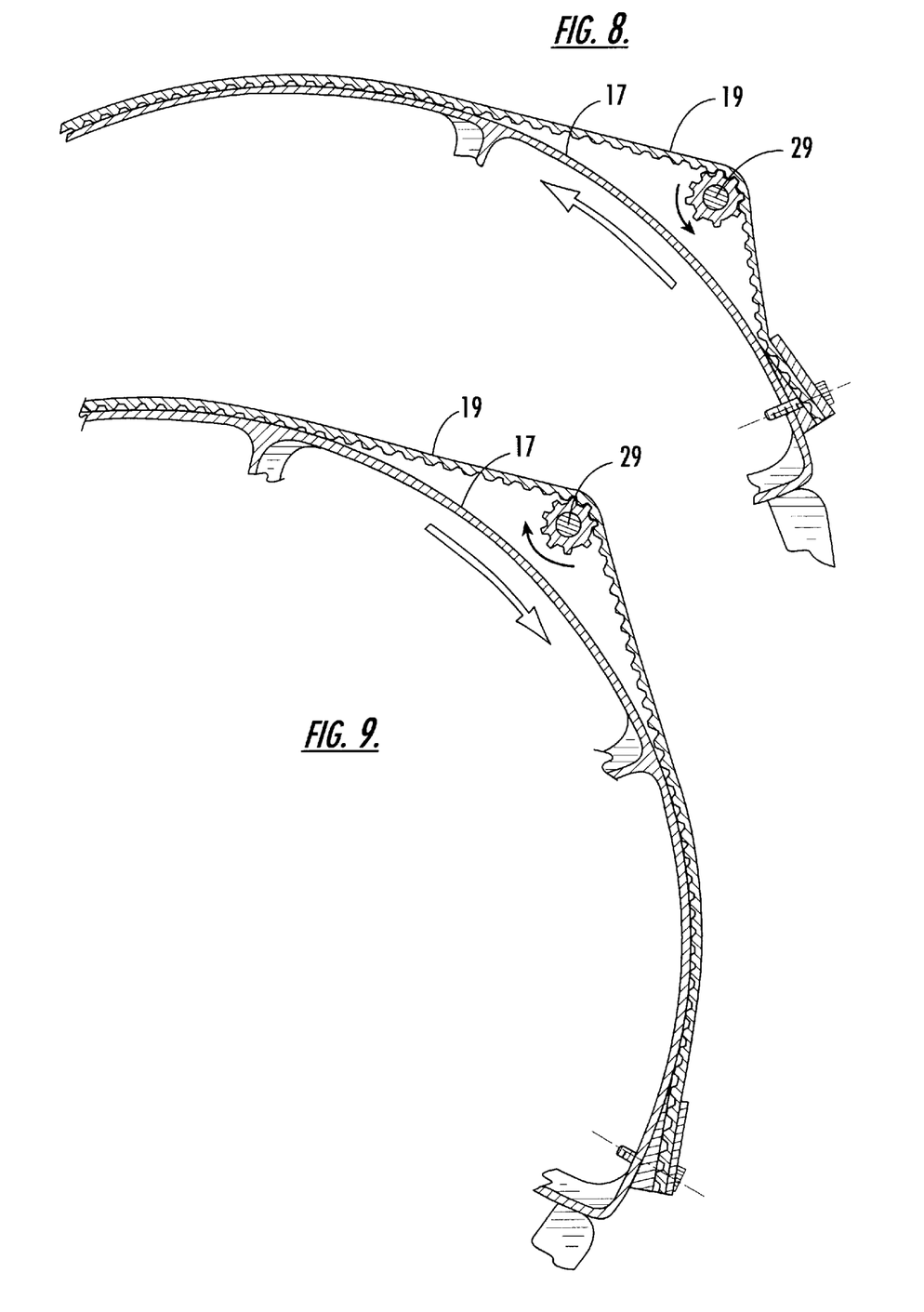
FIGS. 8 and 9 are fragmentary views of a portion of the support hub and drive belt of the present invention for coarse adjustment of the sighting apparatus about a coarse first axis defined by the support ring.
Figure 10:
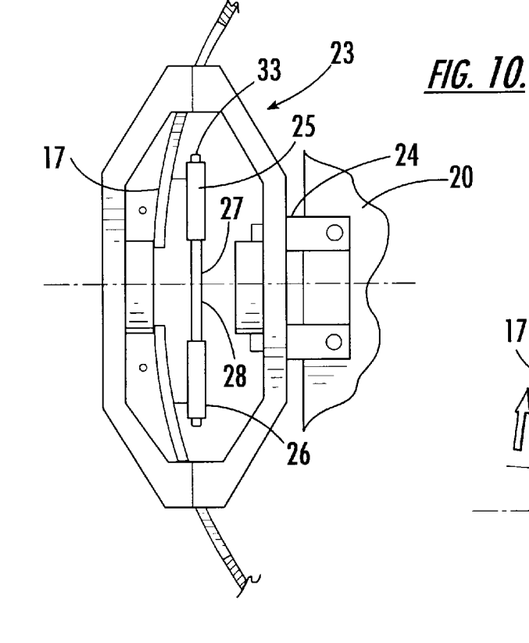
FIGS. 10, 11 and 12 are side views of a two axis electromagnetic actuator according to the present invention and illustrate the direction of fine adjustment of the apparatus about a fine first axis substantially coincident with the coarse first axis.
Figure 11:
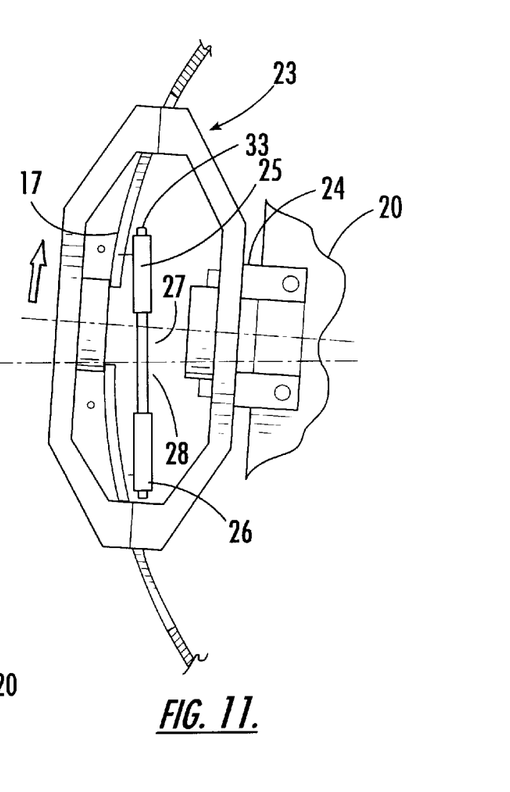
Figure 12:
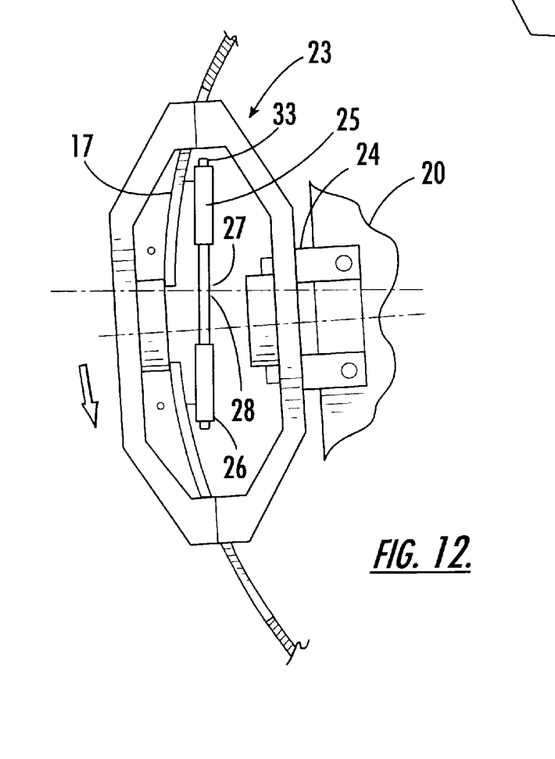

Referring to FIG. 7, a support hub 17 is rotatably supported, such as by a pair of ball bearings 36, within the outer support ring 13. As best illustrated in FIG. 2, support hub 17 is capable of rotation about the elevational axis CE relative to the outer support ring 13. In one embodiment, the support hub 17 is rotated about the elevational axis CE by a second drive motor 18 through communication with one of the at least two single axis autocollimators 16, shown in FIG. 3. The second drive motor 18 is mounted on the outer support ring 13 such as by bolts. Preferably, base sections 16a of the autocollimators 16 are bolted to one of two mounting plates 20 and mirrors 16b of the autocollimators 16 are bolted to the support hub 17. Through communication with the autocollimators 16, the support hub 17 is driven by a belt 19 and a pinion gear 29 which are driven by the second drive motor 18 as shown in FIGS. 8 and 9. Once again referring to FIG. 3, bumper mechanisms 35, each having a first section 35a and a second section 35b, are attached to the support hub 17 and the support ring 13. The bumper mechanisms 35 limit the degree of travel of the support hub 17 relative to the outer support ring 13. The support hub 17 may travel through a range of motion of approximately +70 to −20 degrees.

As best illustrated in FIG. 2, rotation of the outer support ring 13 about the azimuthal axis CA and rotation of the support hub 17 about the elevational axis CE relative to the outer support ring 13 provides coarse adjustment to the sighting apparatus 10.

The optical devices 12 are attached to the mounting plates 20, preferably by bolts. The mounting plates 20 and are attached to the center of the support hub 17 by a spherical bearing 21. The spherical bearing 21 is supported by a number of commercially available steel cable vibration isolators 30 which are mounted on the support hub 17. The mounting plates 20 are attached to opposing ends of the spherical bearing 21 such that the mounting plates 20 float on the spherical bearing 21 as shown by the phantom lines in FIG. 7.

Referring again to FIG. 2, the mounting plates 20 are supported by the spherical bearing 21 and the support hub 17 for movement about a fine first axis, elevational axis FE, and a fine second axis, azimuthal axis FA. The elevational axis FE is substantially coincident with the coarse first axis defined by the outer support ring 13 and azimuthal axis FA is substantially coincident with the coarse second axis orthogonal to the coarse first axis defined by the outer support ring 13.

As shown in FIGS. 2 and 3, the sighting apparatus 10 also includes a two axis electromagnetic actuator 22, such as that disclosed in U.S. Pat. No. 4,833,351 which is fully incorporated herein by reference. The two axis electromagnetic actuator 22 has at least one magnet which is fixed to one of either the support hub 17 or the mounting plates 20 and at least two electrical coils fixed to the other of the support hub 17 and the mounting plates 20. Those skilled in the art understand that multiple magnets and electrical coils may be used.

In the preferred embodiment, as shown in FIGS. 10 through 13, a single magnet 23 is attached to the mounting plates 20 by a bracket 24. Two pairs of electrical coils, a first pair, coil 25 and coil 26, and a second pair, coil 27 and coil 28, are supported within a plate 33 which is attached to the support hub 17. It is preferable to attach the magnet 23 to the mounting plates 20 and to attach the electrical coils to the support hub 17 to minimize the exposure of electrical wires and cables to moving parts, namely the mounting plates 20. The magnet 23 is movable about the elevational axis FE relative to the support hub 17 upon the application of electrical energy to the coils 25 and 26, as shown in FIGS. 15 and 17, and is movable about the azimuthal axis FA relative the support hub 17 upon the application of electrical energy to the coils 27 and 28, as shown in FIGS. 14 and 16.

Figures 15, 16, 17:
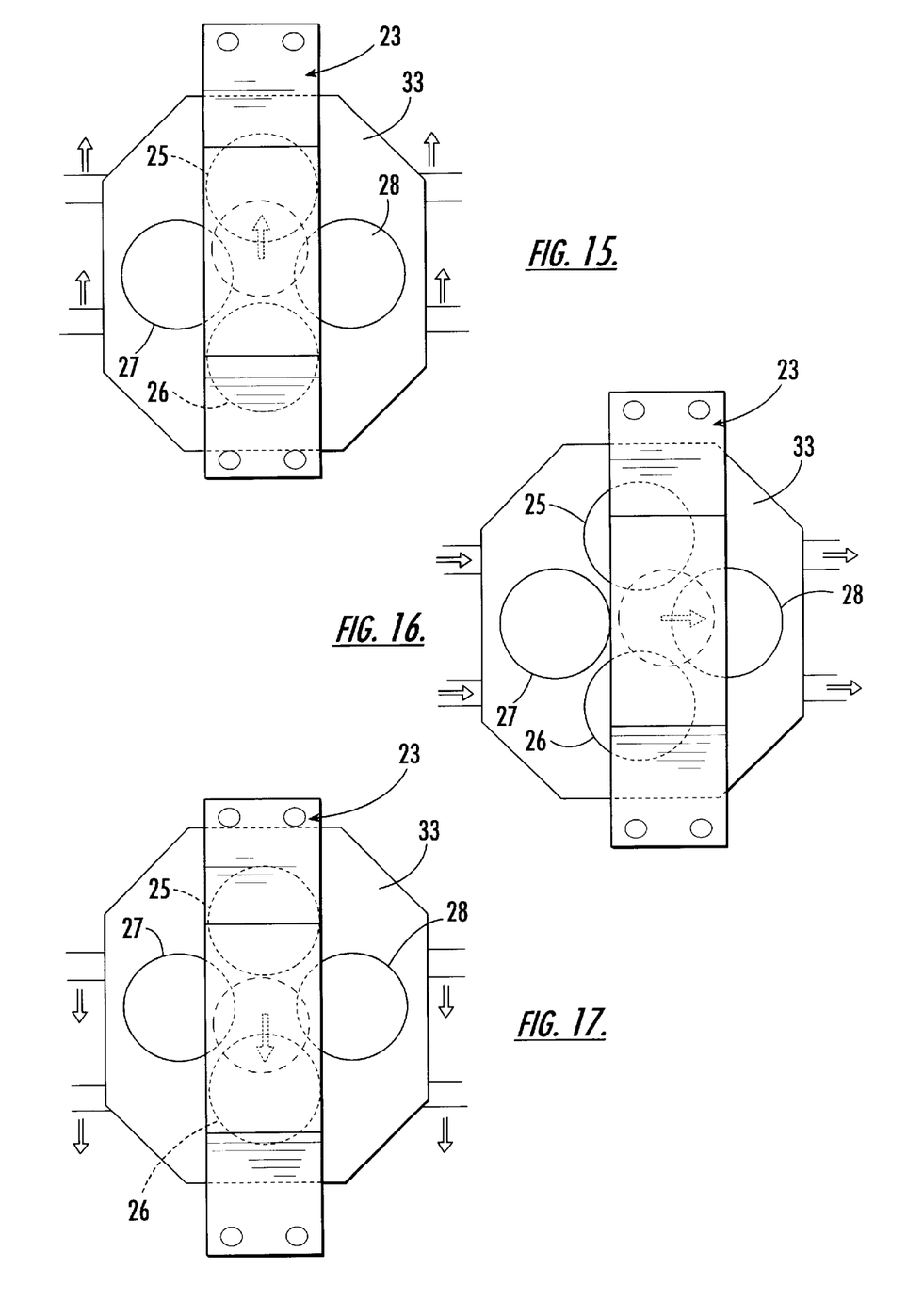
FIGS. 15 and 17 are elevational views of the two axis electromagnetic actuator illustrating the direction of fine adjustment of the apparatus about the fine first axis.

Specifically, referring to FIGS. 15 and 17, movement of the magnet 23, and therefore the mounting plates 20, relative to the support hub 17 about the elevational axis FE is achieved by energizing the coils 25 and 26 in equal and opposite directions. When current is applied to both coils simultaneously to cause the two surfaces of one of the two coils 25 and 26 to magnetically oppose the polarity of the magnet 23 and the two surfaces of the other of the coils 25 and 26 to be magnetically attracted to the magnet 23, a magnetic field will be created and one of the coils 25 and 26 will be drawn into the magnetic field between the north and south poles of the magnet 23 and the other of the two coils 25 and 26 will be expelled from the magnetic field between the two poles of the magnet 23. The mounting plates 20 are thereby moved, via the magnet 23 and relative to the support hub 17, about elevational axis FE, thereby keeping mounting plates 20 stationary in inertial space.

Figures 13, 14:
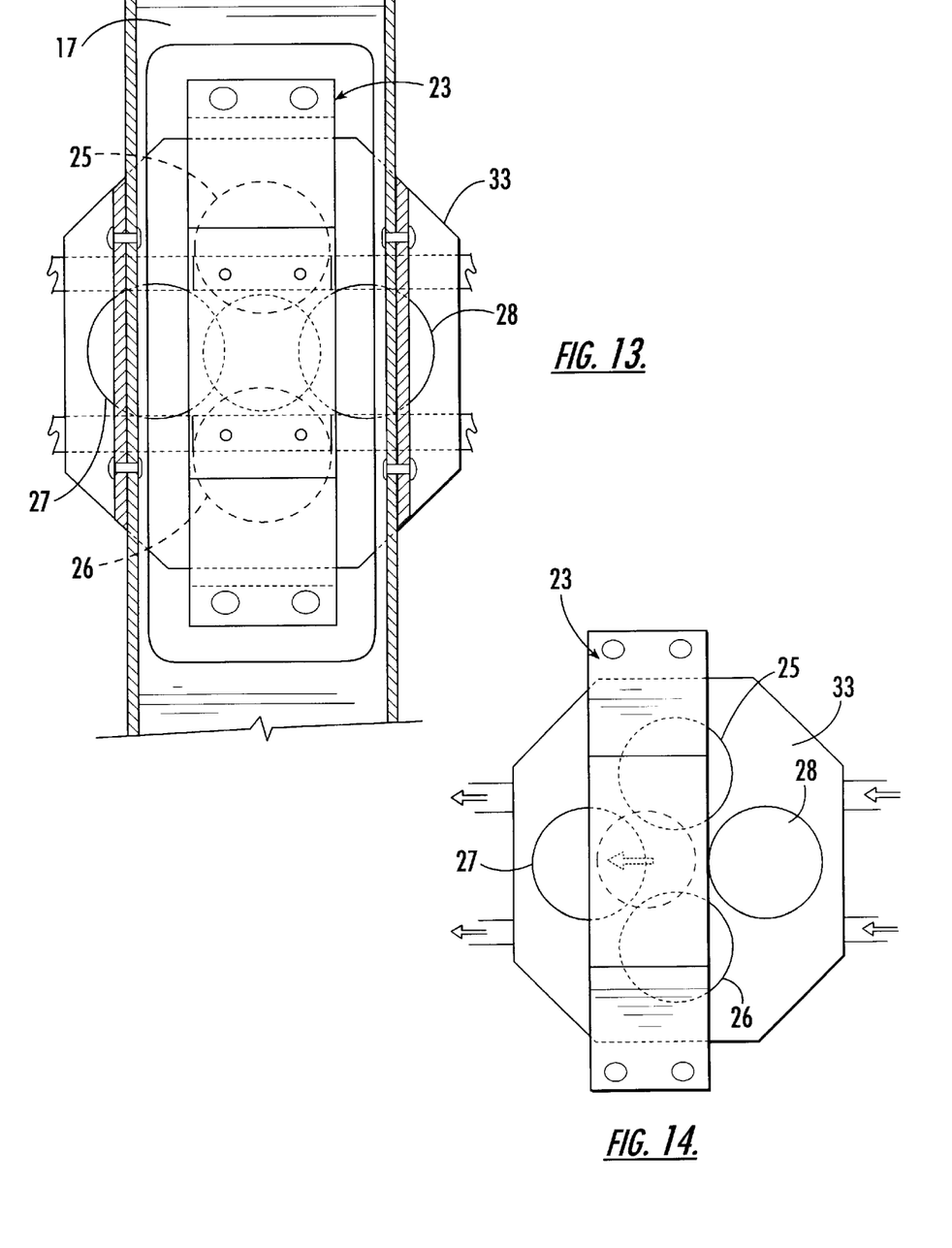
FIG. 13 is an elevational view of the two axis electromagnetic actuator.
FIGS. 14 and 16 are elevational views of the two axis electromagnetic actuator illustrating the direction of fine adjustment of the apparatus about a fine second axis which is substantially coincident with a coarse second axis.

Likewise, referring to FIGS. 14 and 16, movement of the magnet 23, and therefore the mounting plates 20, relative to the plate 33 about the azimuthal axis FA is achieved by energizing the coils 27 and 28 in equal and opposite directions. When current is applied to both coils simultaneously to cause the two surfaces of one of the two coils 27 and 28 to magnetically oppose the polarity of the magnet 23 and the two surfaces of the other of the coils 27 and 28 to be magnetically attracted to the magnet 23, a magnetic field will be created and one of the coils 27 and 28 will be drawn into the magnetic field between the north and south poles of the magnet 23 and the other of the coils 27 and 28 will be expelled from the magnetic field between the two poles of the magnet 23. The mounting plates 20 are thereby moved, via the magnet 23 and relative to the support hub 17, about azimuthal axis FA, thereby keeping mounting plates 20 stationary in inertial space. Preferably, at least two single axis gyroscopes 31 and 32, shown in FIG. 3, provide the electrical energy to the coil pairs 25 and 26, and 27 and 28 and thereby move the mounting plates 20 about the elevational axis FE and the azimuthal axis FA.

In one embodiment of the present invention, as shown in FIG. 2, a pair of roll spring dampers 34 are mounted to the support hub 17 between the mounting plates 20 along the azimuthal axis FA. The roll spring dampers 34 damp the movement of the mounting plates 20 about a roll axis FR perpendicular to the azimuthal axis FA and the elevational axis FE. By maintaining the mounting plates 20 stationary in inertial space, through movement of the plates 20 relative to the support hub 17 about the elevational axis FE and the azimuthal axis FA, and damping of the mounting plates 20 about the roll axis FR, the electromagnetic actuator 22 and the roll spring dampers 34 provide fine adjustment to the sighting apparatus 10 about the three axes.

Figures 4, 5, 6:
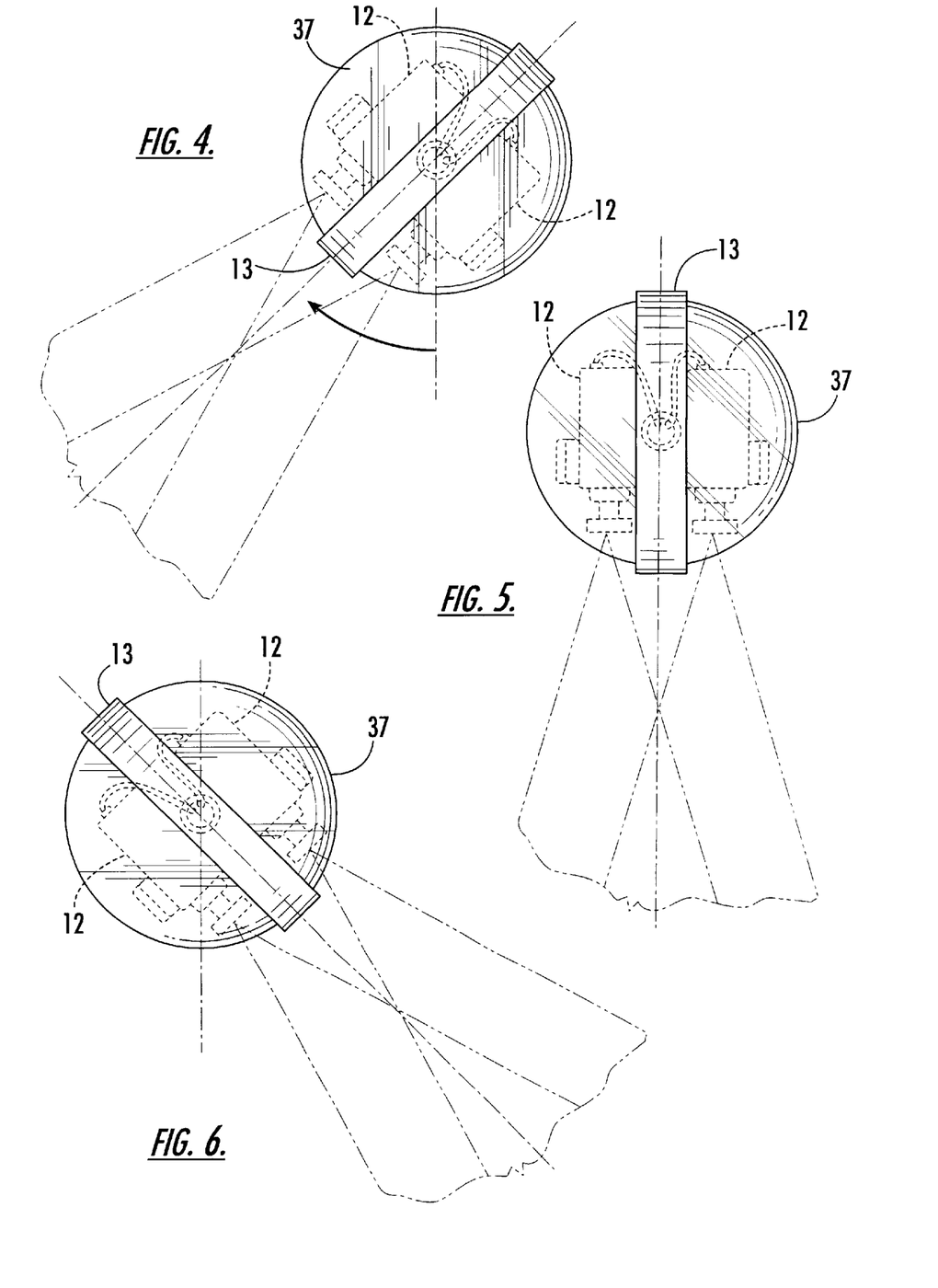
FIGS. 4, 5 and 6 are top plan views of a sighting apparatus according to the present invention with two optical devices mounted thereto and illustrate coarse adjustment of the line of sight of two optical devices in an axis orthogonal to the axis defined by the outer support ring of the present invention.

In operation, the sighting apparatus 10 as generally illustrated in FIG. 2 is mounted to the mast of the helicopter 11 as shown in FIG. 1. If the vehicle is put into motion the sighting apparatus 10 will tend to stay in the same position of reference. The operator may direct the optical devices 12 towards an object to be observed or recorded by use of a joy stick or other control mechanism. As shown in FIGS. 4, 5 and 6, by operating a control mechanism the optical devices 12 may be rotated or panned about the azimuthal axis CA by operation of the first drive motor 15 housed within the fixed base 14 as shown in FIG. 2. Likewise, the optical devices 12 may be moved about the elevational axis CE by operation of the second drive motor 18, shown in FIG. 3, in conjunction with the pinion gear 29 and the belt 19, as shown in FIGS. 8 and 9.

Having established a reference position on the object to be photographed or recorded, the gyroscopes 31 and 32, shown in FIG. 3 and discussed below, will cause the optical devices 12 to remain aimed in the same direction regardless of the movement of the aircraft. As illustrated in FIG. 7, the spherical bearing 21 provides passive angular isolation of the sighting apparatus 10 from angular disturbances from the movement of the helicopter 11. Similarly, the steel cable vibration isolators 30 passively attenuate linear disturbances to the sighting apparatus 10.

As shown in FIG. 2, the sighting apparatus 10 is further isolated from angular disturbances by a fine adjustment device that maintains the sighting apparatus 10 inertially stable in the azimuthal axis FA and the elevational axis FE, perpendicular to the line of sight of the optical devices 12. This fine adjustment device is a high bandwidth control system and is limited only by structural resonance and is able to provide microradian stability in high vibration environments. Preferably, the fine adjustment device is comprised of the support hub 17, the mounting plates 20, the two axis electromagnetic actuator 22 and the gyroscopes 31 and 32, shown in FIG. 3. The gyroscopes 31 and 32 sense pitch and yaw angular motion of the helicopter 11 and the sighting apparatus 10. To achieve this result, either two singe axis gyroscopes or one or two axis gyroscope can be used. The gyroscope signals are amplified and used to drive the two axis electromagnetic actuator 22, as described above, to null the outputs of the gyroscope 31 and 32, thereby moving the mounting plates 20 relative to the support hub 17 in two axes as shown in FIGS. 14 and 15, and 16 and 17. As can be appreciated from FIG. 2, this action causes the fine adjustment device of the sighting apparatus 10 to be inertially stabilized about the azimuthal axis FA and the elevational axis FE, perpendicular to the line of sight of the optical devices 12. Stabilization of the sighting apparatus 10 about the roll axis FR is achieved by the roll spring dampers 34 which cause the sighting apparatus to smoothly follow the helicopter motions about the line of sight of the optical devices.

When the fine adjustment device is moved, the coarse adjustment of the sighting apparatus 10 follows the fine system and is driven by the first drive motor 15 and the second drive motor 18 with reference to FIGS. 2 and 3. As best demonstrated in FIG. 2, the two single axis autocollimators 16 sense the angles between the azimuthal axis FA and the azimuthal axis CA and the elevational axis FE and the elevational axis CE. These signals are used to coarsely adjust the sighting apparatus 10 by driving the outer support ring 13 about the azimuthal axis CA and the support hub 17 about the elevational axis CE until the angle between the azimuthal axis FA and the azimuthal axis CA and the angle between the elevational axis FE and the elevational axis CE are zeroed out and the outputs of the two single axis autocollimators 16 are nulled. This motion causes the outer support ring 13 and the support hub 17 to follow the fine adjustment device, thereby maintaining the aim of the optical devices 12 irrespective of the maneuvers of the helicopter 11.

Many modifications and other embodiments of the invention will come to mind to one skilled in the art to which this invention pertains having the benefit of the teachings presented in the foregoing descriptions and the associated drawings. For example, the present invention has been described with reference to a helicopter, although the device could be used in connection with any moving platform where it is desirable to stabilize a sighting apparatus. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation, the scope of the invention being set forth in the following claims.

What is claimed is:

1. A sighting apparatus for aiming an optical device having both coarse and fine adjustment, said device comprising:

a fixed base;

an outer support ring defining a coarse first axis and being rotatably supported on said base for rotation about a coarse second axis orthogonal to said coarse first axis;

a first drive motor for rotating said outer support ring relative to said base and providing coarse adjustment about the coarse second axis;

a support hub rotatably supported by said support ring for rotation about the coarse first axis defined by said support ring;

a secondary drive motor for rotating said support hub relative to said outer support ring and providing coarse adjustment about the coarse first axis;

at least one mounting plate for mounting an optical device to be aimed by said sighting apparatus, said mounting plate being supported by said support hub and being movable about said coarse first axis said coarse second axis, a fine first axis and a fine second axis, wherein said fine first axis is substantially coincident with said coarse first axis and said fine second axis is substantially coincident with said coarse second axis; and a two axis electromagnetic actuator having at least one magnet fixed to one of said support hub and said mounting plate and at least two electrical coils fixed to the other of said support hub and said mounting plate, said magnet being movable in two axes relative to said electrical coils upon the application of electrical energy to said coils such that said mounting plate is moved about said fine first axis and said fine second axis relative to said support hub.

2. A sighting apparatus as defined in claim 1 wherein said at least one magnet is fixed to said mounting plate and said at least two electrical coils are fixed to said support hub.

3. A sighting apparatus as defined in claim 1 wherein said coarse first axis is substantially horizontal and defines an elevational axis.

4. A sighting apparatus as defined in claim 1 wherein said coarse second axis is substantially vertical and defines an azimuthal axis.

5. A sighting apparatus as defined in claim 1, further comprising at least two single axis gyroscopes fixed to said mounting plate for communicating with said electrical coils, thereby moving said magnet in two axes relative to said electrical coils such that said mounting plate is moved relative to said support hub about said fine first axis and said fine second axis.

6. A sighting apparatus as defined in claim 1, further comprising at least one two axis gyroscope fixed to said mounting plate for communicating with said electrical coils, thereby moving said magnet in two axes relative to said electrical coils such that said mounting plate is moved relative to said support hub about said fine first axis and said fine second axis.

7. A sighting apparatus as defined in claim 1, further comprising a drive belt associated with said second drive motor for rotating said support hub relative to said outer support ring and providing coarse adjustment about the coarse first axis.

8. A sighting apparatus as defined in claim 1, further comprising at least one gear associated with said second drive motor for rotating said support hub relative to said outer support ring and providing coarse adjustment about the coarse first axis.

* * * * *